(12) United States Patent
Agrawal et al.

(10) Patent No.: US 7,890,591 B2
(45) Date of Patent: Feb. 15, 2011

(54) METHOD FOR AN EFFICIENT ELECTRONIC MESSAGING SYSTEM

(75) Inventors: Sachin Omprakash Agrawal, Jalna (IN); Vijil Enara Chenthamarakshan, Kerala (IN); Eric Willfred Bruno Dlas, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 12/023,412

(22) Filed: Jan. 31, 2008

(65) Prior Publication Data

US 2009/0198779 A1   Aug. 6, 2009

(51) Int. Cl.
G06F 15/16 (2006.01)
G06F 7/04 (2006.01)
(52) U.S. Cl. ........................................ 709/206; 726/27
(58) Field of Classification Search ......... 709/204–207; 726/2–21, 26–33
See application file for complete search history.

(56) References Cited

U.S. PATENT DOCUMENTS

| | | | |
|---|---|---|---|
| 6,721,784 B1 * | 4/2004 | Leonard et al. ............. | 709/206 |
| 6,938,065 B2 * | 8/2005 | Jain ........................... | 709/201 |
| 2002/0013817 A1 * | 1/2002 | Collins et al. ............... | 709/206 |
| 2002/0040387 A1 * | 4/2002 | Lessa et al. .................. | 709/206 |
| 2003/0163538 A1 * | 8/2003 | Yeh et al. ..................... | 709/206 |
| 2004/0068544 A1 * | 4/2004 | Malik et al. .................. | 709/206 |
| 2007/0005717 A1 * | 1/2007 | LeVasseur et al. .......... | 709/206 |
| 2007/0143429 A1 * | 6/2007 | Venkataraman et al. ..... | 709/206 |
| 2007/0294358 A1 * | 12/2007 | Kelley et al. ................ | 709/206 |

* cited by examiner

Primary Examiner—William C Vaughn, Jr.
Assistant Examiner—Shirley X Zhang
(74) Attorney, Agent, or Firm—Yee & Associates, P.C.; David A. Mims, Jr.

(57) ABSTRACT

A computer implemented method and computer program product for efficiently managing messages handled by electronic messaging systems. A unique header is associated with a first electronic message and a link is created, which is associated with the unique header. The link is embedded in a second electronic message as part of an electronic message chain originating with the first electronic message. The second electronic message is transmitted with the embedded link to a set of recipients without the first electronic message.

14 Claims, 5 Drawing Sheets

METHOD FOR AN EFFICIENT ELECTRONIC MESSAGING SYSTEM

BACKGROUND OF THE INVENTION

1. Field of the Invention

The present invention relates generally to a data processing system and in particular to a method and computer program product for managing messages using a data processing system. More particularly, the present invention is directed to a computer implemented method and computer usable program code for efficiently managing messages handled by electronic messaging systems.

2. Description of the Related Art

Electronic messaging systems have become a standard means of communication in the business world, as well as with the general population. Typically, messages sent to one or more recipients are exchanged numerous times through reply and forwarded messages, creating a chain of electronic messages or threads. This chain may be referred to as an email chain. Each time a message is exchanged between various recipients, the email chain becomes larger as each previous message is included in subsequent messages. As the contents of all previous messages are transmitted throughout the exchanges within an email chain, unless explicitly deleted by users, there is an increase in network traffic due to the transmission of redundant data over numerous exchanges.

The redundant data may appear as quoted text in the most current message, and may also appear in full text beneath the most current message. With the resulting increase in message size, the transmission time for the message to travel over the network is also increased. Thus, the efficiency of electronic messaging systems is negatively impacted as an email chain is exchanged.

SUMMARY OF THE INVENTION

The illustrative embodiments provide a computer implemented method and computer program product for efficiently managing messages handled by electronic messaging systems. A unique header is associated with a first electronic message and a link is created, which is associated with the unique header. The link is embedded in a second electronic message as part of an electronic message chain originating with the first electronic message. The second electronic message is transmitted with the embedded link to a set of recipients without the first electronic message.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
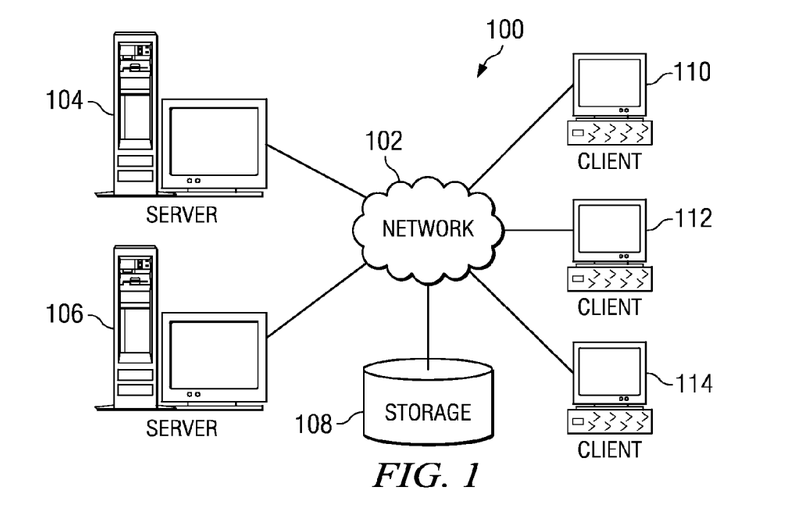
FIG. 1 is a pictorial representation of a network of data processing systems in which illustrative embodiments may be implemented.
Figure 2:
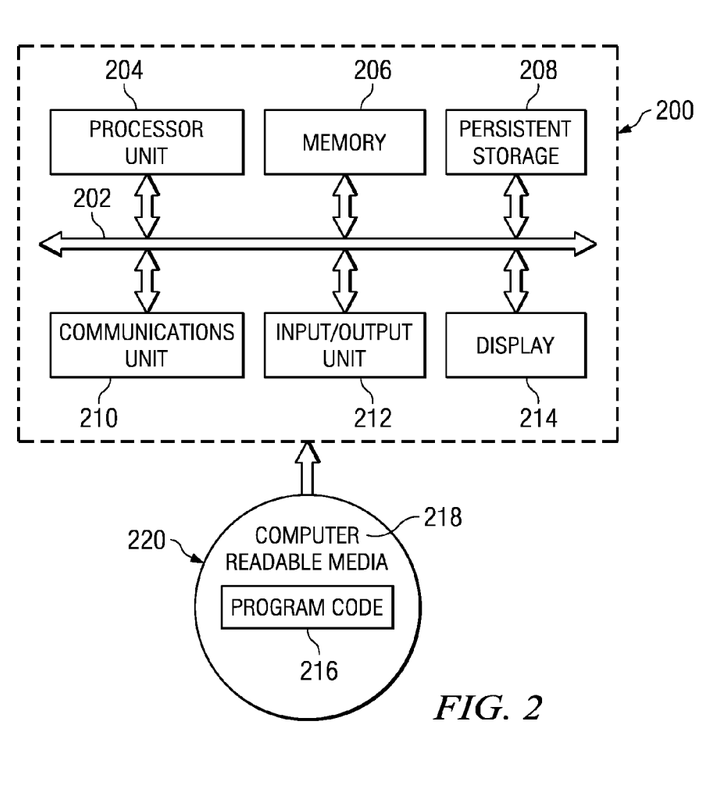
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, fiber optic cables or a combination thereof.

In the depicted example, server 104 and server 106 connect to network 102 along with storage unit 108. In this example, server 104 includes an electronic messaging system manager for managing electronic messages in an electronic message chain. Electronic messages may be exchanged between computer devices, such as clients 110, 112, and 114.

In addition, clients 110, 112, and 114 connect to network 102. Clients 110, 112, and 114 may be, for example, personal computers, network computers, laptop computers, PDA's, mobile phones and the like. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). In one embodiment, network 102 may also includes mobile switching networks connecting mobile devices and routing traffic via a base station. FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links. Various other devices such as a modem or IEEE 1394 interface, a serial bus interface standard, may be used as a communication unit and it should be apparent to a person skilled in the art that such devices being used as communication unit 210 fall under the scope of the present invention.

Input/output unit 212 allows for input and output of data with other devices that may be connected to data processing system 200. For example, input/output unit 212 may provide a connection for user input through a keyboard, mouse, or microphone. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments recognize a need for an electronic messaging system that is capable of automatically managing electronic message history in an electronic message chain, so as to decrease the size and increase the transmission speed of subsequent electronic messages in an electronic message chain.

Therefore, the illustrative embodiments provide a computer implemented method and computer program product for efficiently managing messages handled by electronic messaging systems. A unique header is associated with a first electronic message. In one embodiment the unique header containing the header information of the first electronic message and a finder, for example a pointer, which contains additional information such as a location address of the first electronic message. The unique finder in the unique header facilitates in retrieving the first electronic message. A header is a unit of information that precedes a data object. In a network transmission, a header is part of the data packet and contains transparent information about the file or the transmission. In a further embodiment, the first electronic message may further contain a finder, in addition to the unique header. The finder is further associated with the unique header and is a search tool/facility that locates a file based on the file's unique header. An electronic message is any type of message transmitted over a network, including, without limitation, e-mail.

A link is created, which is associated with the unique header and/or the finder. A link, also referred to as a hyperlink, is an element in an electronic document that links to another place in the same document or to an entirely different document. The link is embedded in a second electronic message as part of an electronic message chain originating with the first electronic message.

When the link embedded in the second electronic message is selected, the first electronic message is retrieved. Thus, the appended text of the previous message is replaced by a link pointing to the originating or previous message. This reduces the size of the message being transmitted and received without the loss of the history, i.e., the previous messages or threads, thereby keeping all information easily accessible to users. When the cursor or mouse is placed over the links which are related to the first electronic message, the contents of the first electronic message is pre-fetched and displayed to the user preferably in a pop-up window. Once access to the contents is completed the pre-fetched contents may be flushed from the memory.

Figure 3:
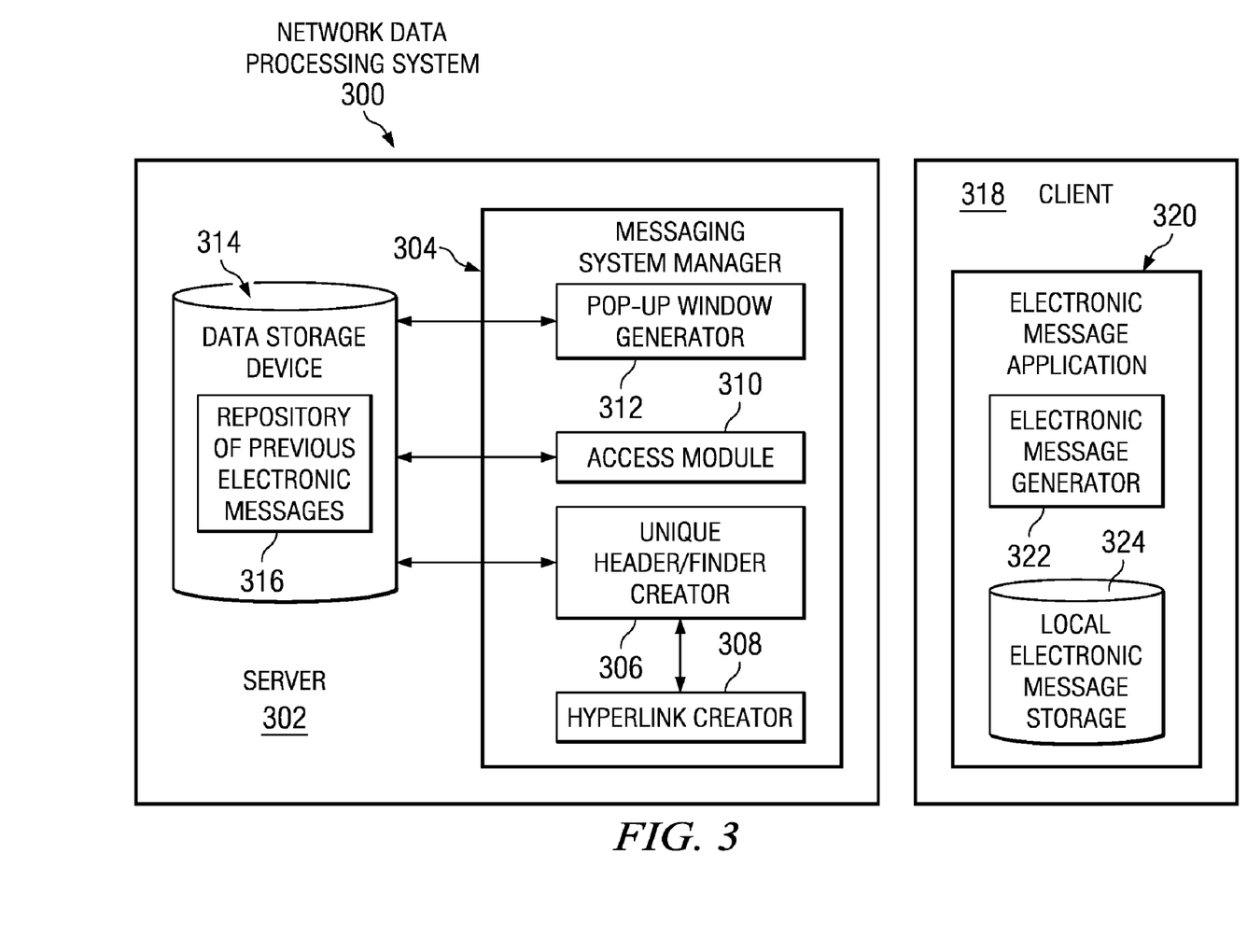
FIG. 3 is a block diagram illustrating an electronic messaging system manager in accordance with an illustrative embodiment.

FIG. 3 is a block diagram illustrating an electronic messaging system manager. Network data processing system 300 may be implemented using any type of computing device, including, without limitation, a personal computer, laptop, personal digital assistant, mobile phones, a server, or any other computing device depicted in FIGS. 1 and 2.

Server 302 has software maintained in a network environment for managing electronic messaging systems through message manager 304. Server 302 may be implemented as any type of server, such as, without limitation, server 104 in FIG. 1. Message manager 304 includes unique header/finder creator 306, hyperlink creator 308, access module 310, and pop-up window generator 312.

Every electronic message has a particular format defined by Requests for Comments 2822 (RFC 2822) and Multipurpose Internet Mail Extensions (MIME). The electronic message format inherently creates a header at the time an electronic message is created in accordance with RFC 2822. Unique header/finder creator 306 assigns a unique header and/or a unique finder to each electronic message generated within the electronic messaging system. The unique header and/or finder attached to the electronic message are created during subsequent transaction of the first email. The unique header contains the previous/originating header information and is modified by attaching a pointer to the header, for example the address location of the previous electronic message. For example, the pointer may be a sequence chosen by the server, such as server 104 in FIG. 1, and may be comprised of alphanumeric characters or may be randomly generated. In another embodiment, the pointer may be the original header of the first electronic message and additional information such as IP address of the machine, the storage folder of the electronic message and so on. A variety of parameters can be used to create this unique header which will form the link. The pointer now acts as a reference to locate the appropriate electronic message in the server or in an archived system on the client.

Hyperlink creator 308 generates a link based on the unique header assigned to an electronic message. The link points to the electronic message, allowing the electronic message associated with the link to be retrieved in a subsequent electronic message. For every previous message in the trail, only a link is maintained with the advantage of the actual mail content not being transmitted over the network and thereby reducing the load on the network.

Access module 310 manages the access granted to new recipients in an existing electronic message chain. When a current recipient adds a new recipient to an existing electronic message chain, access module 310 provides the current recipient with access options to select for new recipient access. If the current recipient chooses to restrict access to previous electronic messages in the chain, the threads may be encrypted in such a way that only those recipients of the previous electronic messages can access the previous history. In one embodiment, the encryption mechanism can issue a key to the intended recipients so that only those intended recipients can view the contents of the link. In a further embodiment, if the current recipient chooses to restrict access to previous electronic message in the chains, those particular links can be selectively disabled.

Pop-up window generator 312 displays the content of a previous electronic message selected via the hyperlink associated with the previous electronic message. As the previous messages are not tagged to the electronic message, when the cursor or mouse is placed on the link, access module 310 is configured to pre-fetch the contents of the particular electronic message into the memory of the system and display the contents that are pre-fetched in a pop-up window generated by pop-up window generator 312. In another embodiment, the contents of the previous electronic message may be pre-fetched and displayed in the body of the current electronic message. The pre-fetched contents will be flushed from the memory of the local client device once the pop-up window is cancelled or the electronic message is closed.

Server 302 includes data storage device 314 for storing repository of previous electronic messages 316. Data storage device 314 may be implemented in any type of known or available device for storing data, such as, without limitation, a hard drive, main memory, a flash memory, or any other type of data storage device. For example, data storage device 314 may be implemented as a data store, such as storage 108 in FIG. 1 or memory 206 in FIG. 2. Repository of previous electronic messages 316 contains a plurality of existing electronic messages generated by the electronic messaging system. A plurality of existing electronic messages includes any previously generated electronic messages that have not been permanently deleted from the electronic messaging system.

In one embodiment, if the message has been deleted from client 318 and available on the server 302, creation of the unique header can store locations of the client message copy and well as the server message copy. If the message is available on the server, the server copy of the message may be displayed with intimation to the user that the message being displayed is a copy from the server.

Client 318 hosts electronic message application 320. Electronic message application 320 contains electronic message generator 322 and local electronic message storage 324. Electronic message generator 322 generates an electronic message at the prompting of an end user. Local electronic message storage 324 stores electronic messages received by the client until the electronic message is deleted by an end user.

Figure 4:
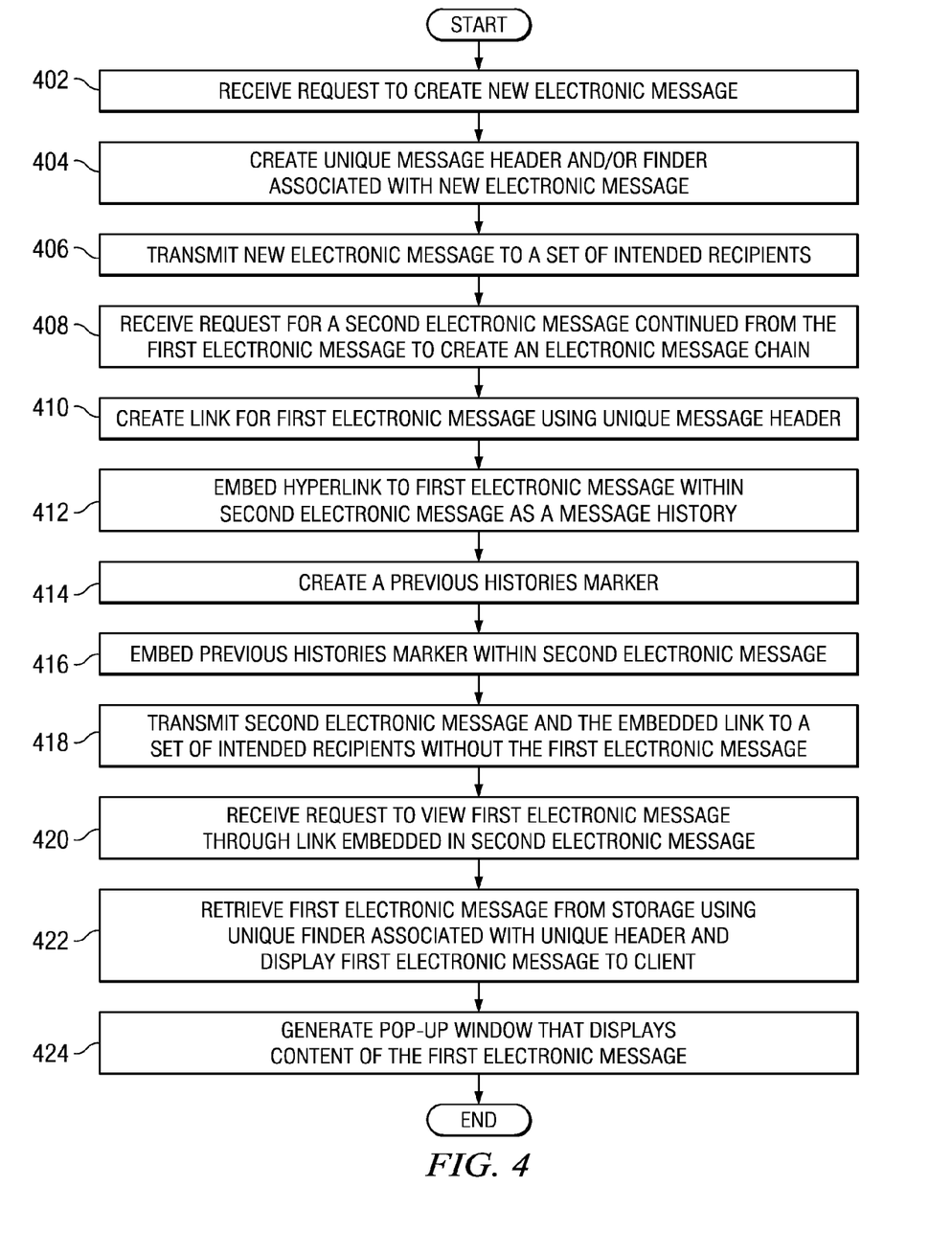
FIG. 4 is a flowchart illustrating a process for creating a unique link to previous messages to embed in subsequent messages of the same electronic message chain in accordance with an illustrative embodiment.

FIG. 4 is a flowchart illustrating a process for creating a unique link to previous messages to embed in subsequent messages of the same electronic message chain. The process in FIG. 4 is implemented by software for managing electronic messaging systems, such as message manager 304 in FIG. 3.

The process begins by receiving a request to create a new electronic message (step 402). The process creates a unique message header and/or finder associated with the new electronic message (step 404), using a unique header/finder creator such as unique header/finder creator 306 in FIG. 3. For example, unique header/finder creator 306 assigns a unique header to the new electronic message in accordance with RFC 2822. The process then transmits the new electronic message to a set of intended recipients (step 406). Next, the process receives a request for a second electronic message continued from the first electronic message to create an electronic message chain (step 408). For example, an end user recipient of the first electronic message may choose to reply to the first electronic message, creating a request for a second electronic message that continues from the first electronic message, resulting in an electronic message chain. In another example, an end user recipient may choose to forward the first electronic message to a new recipient, creating a subsequent electronic message that continues from the first electronic message.

Next, the process creates a link for the first electronic message using the unique message header (step 410). The link may be created using a link creator, such as hyperlink creator 308 in FIG. 3, which interacts with a header creator, such as unique header/finder creator 306 in FIG. 3, in order to create a link associated with the unique header of the first electronic message. Then, the process embeds only the link to the first electronic message within the second electronic message as a message history (step 412). The link replaces the appended text of the previous message and points to the originating or previous message. This reduces the size of the message being transmitted and received without the loss of the history, i.e., the previous messages or threads.

The process creates a previous histories marker (step 414). A previous histories marker is a marker indicating the number of previous electronic messages in the current electronic message chain. In one embodiment, the marker is an algorithm that deciphers from the current electronic message the number of previous electronic messages associated with the current electronic message. Next, the process embeds the previous histories marker within the second electronic message (step 416). The process then transmits the second electronic message and the embedded link to a set of intended recipients without the first electronic message (step 418). Next, the process receives a request to view the first electronic message through the link embedded in the second electronic message (step 420). A request to view the first electronic message may be executed by placing a cursor within an electronic message application, such as electronic message application 320 in FIG. 3, over the link embedded in an electronic message. A request to view the first electronic message may also be executed by selecting the link embedded in an electronic message. The process retrieves the first electronic message from storage using the unique finder associated with the unique header (step 422), and generates a pop-up window that displays the content of the first electronic message (step 424), with the process terminating thereafter. In another embodiment, the process displays the content of the first electronic message in the body of the second electronic message after a request to view the first electronic message has been received.

Figure 5:
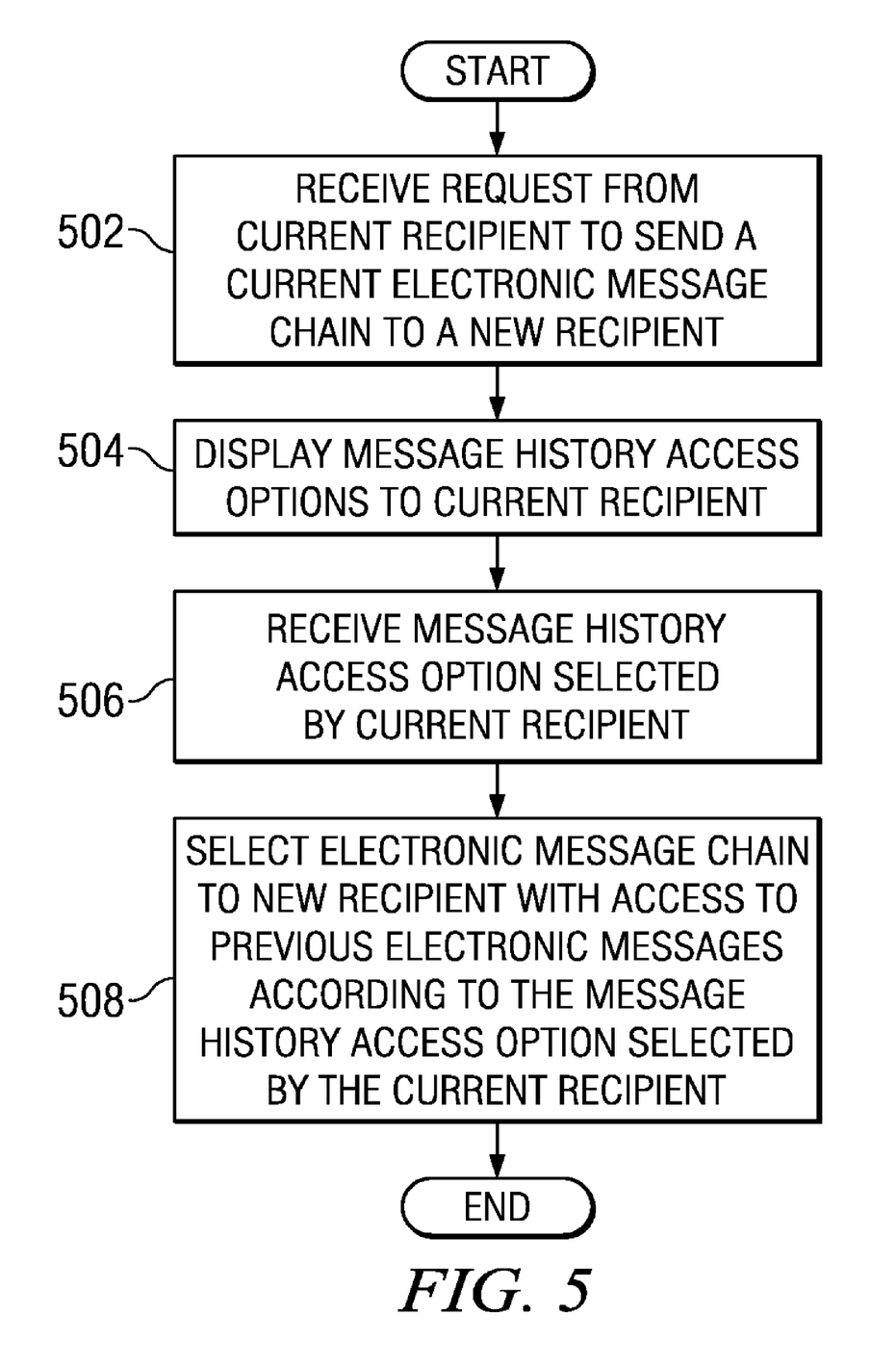
FIG. 5 is a flowchart illustrating a process for allowing and restricting access to previous electronic messages in a electronic message chain in accordance with an illustrative embodiment.

FIG. 5 is a flowchart illustrating a process for allowing and restricting access to previous electronic messages in an electronic message chain. The process in FIG. 5 is implemented by software for managing electronic messaging systems, such as message manager 304 in FIG. 3.

The process begins by receiving a request from a current recipient to send a current electronic message chain to a new recipient (step 502). A new recipient is any recipient that was not a recipient of the electronic message or messages in the current electronic message chain. The process displays message history access options to the current recipient (step 504) through an access module, such as access module 310 in FIG. 3. For example, message history access options may include full access, limited access, and restricted access. In this example, full access indicates that a new recipient is granted access to all previous electronic messages in the current electronic message chain. In this embodiment, limited access indicates that a new recipient is granted access only to specific previous electronic messages selected by the current recipient of the current electronic message chain. Restricted access, in this example, indicates that a new recipient has no access to any previous electronic messages in the current electronic message chain. The access module manages limited and restricted access by encrypting the restricted messages so that only previous recipients of those messages may access the messages through the associated links.

Next, the process receives message history access options selected by the current recipient (step 506). The process sends the electronic message chain to the new recipient with access to previous electronic messages according to the message history access option selected by the current recipient (step 508), with the process terminating thereafter.

Figure 6:
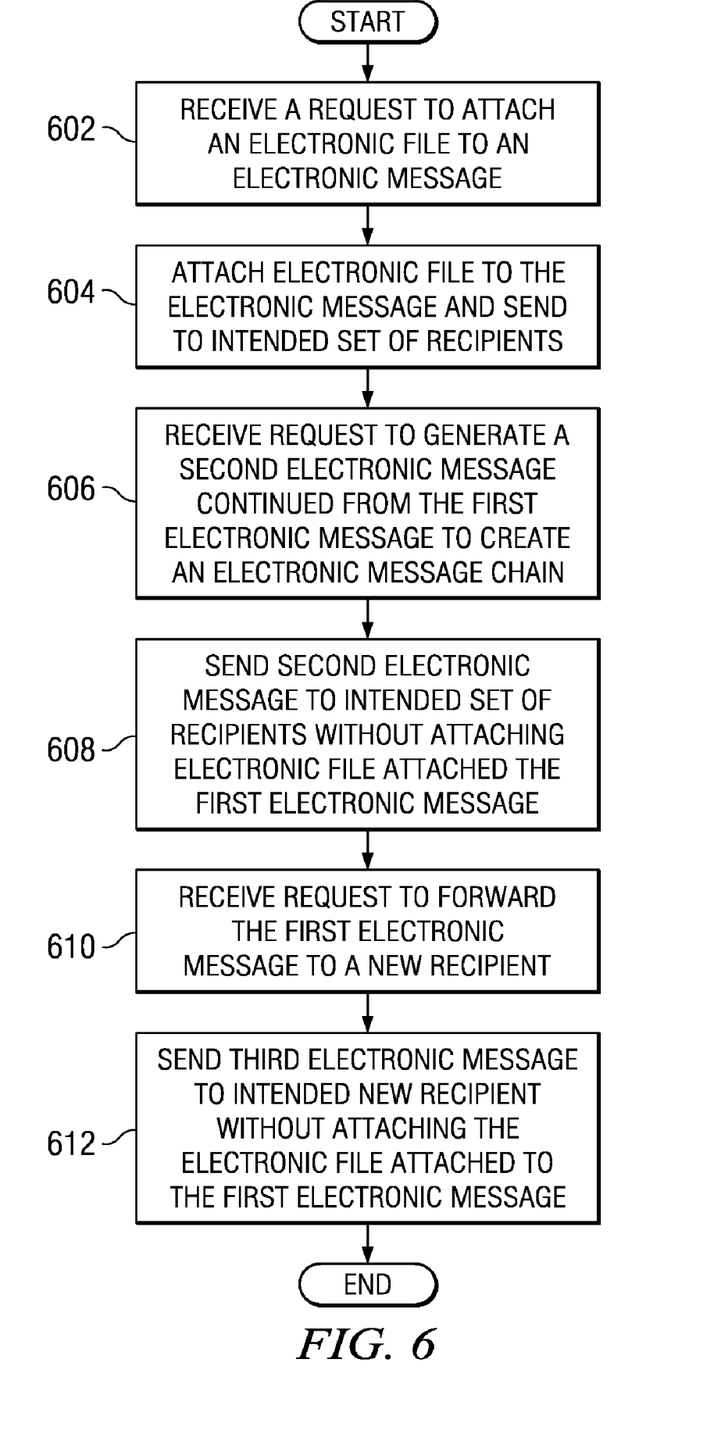
FIG. 6 is a flowchart illustrating a process for managing attachments to an electronic message in an electronic message chain in accordance with an illustrative embodiment.

FIG. 6 is a flowchart illustrating a process for managing attachments to an electronic message in an electronic message chain. The process of FIG. 6 is implemented by software for managing electronic messaging systems, such as message manager 304 in FIG. 3.

The process begins by receiving a request to attach an electronic file to an electronic message (step 602). The process attaches the electronic file to the electronic message and sends the electronic message to the intended set of recipients (step 604). A set of recipients includes one recipient and two or more recipients. Next, the process receives a request to generate a second electronic message continued from the first electronic message to create an electronic message chain (step 606). The process sends the second electronic message to the intended set of recipients without attaching the electronic file that was attached to the first electronic message (step 608).

Then, the process receives a request to forward the first electronic message to a new recipient (step 610). The process sends the third electronic message to the intended new recipient without attaching the electronic file that was attached to the first electronic message (step 612), with the process terminating thereafter.

Thus, the illustrative embodiments provide a computer implemented method, and computer program product for efficiently managing messages handled by electronic messaging systems by creating a unique header associated with a first electronic message, and creating a link, which is associated with the unique header. The link is embedded in a second electronic message as part of an electronic message chain originating with the first electronic message. The second electronic message is transmitted with the embedded link to a set of recipients without the first electronic message.

The illustrative embodiments provide an electronic messaging system that is capable of automatically managing electronic message history in an electronic message chain, so as to decrease the size and increase the transmission speed of subsequent electronic messages in an electronic message chain.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing messages handled by electronic messaging systems, the computer implemented method comprising:

creating a unique header associated with a first electronic message;

creating a hyperlink associated with the unique header, wherein the hyperlink is a selectable element used to replace and link to a content of the first electronic message;

embedding the hyperlink within a second electronic message to replace the content of the first electronic message in the second electronic message, wherein an electronic message chain comprises the first electronic message and the second electronic message, and wherein the electronic message chain originates with the first electronic message; and transmitting the second electronic message containing the embedded hyperlink to a set of recipients without the first electronic message;

retrieving a content of the first electronic message only after receiving a request to view the content of the first electronic message by a user selecting the embedded hyperlink within the second electronic message that replaced the content of the first electronic message in the second electronic message;

responsive to retrieving the content of the first electronic message after receiving the request to view the content of the first electronic message by the user selecting the embedded hyperlink within the second electronic message, generating a separate pop-up window to display the retrieved content of the first electronic message to the user;

responsive to a current recipient of the electronic message chain adding a new recipient, displaying access options to the current recipient that define an ability of the new recipient to access previous electronic messages in the electronic message chain; and responsive to receiving a selection by the current recipient of an access option within the access options displayed to the current recipient, managing the access of the new recipient to the previous electronic messages in the electronic message chain by:

providing the new recipient access to all previous electronic messages in the electronic message chain in response to receiving a selection by the current recipient of a full access option within the access options displayed to the current recipient;

providing the new recipient access to a set of selected previous electronic messages in the electronic message chain in response to receiving a selection by the current recipient of a limited access option within the access options displayed to the current recipient, wherein the set of selected previous electronic messages comprises only specific previous electronic messages in the electronic message chain selected by the current recipient for viewing by the new recipient, and wherein the access to the set of selected previous electronic messages is restricted by encrypting restricted electronic messages in the electronic message chain; and providing the new recipient access to only the current electronic message sent to the new recipient in response to receiving a selection by the current recipient of a restricted access option within the access options displayed to the current recipient.

2. The computer implemented method of claim 1, wherein the unique header includes a unique finder, and wherein the unique finder is configured to locate a respective message associated with the unique header.

3. The computer implemented method of claim 1, wherein the step of retrieving the content of the first electronic message further comprises:
pre-fetching the content of the first electronic message.

4. The computer implemented method of claim 1, further comprising:
responsive to a first user attaching an electronic file to the first electronic message, sending the electronic file with the first electronic message to a set of intended recipients.

5. The computer implemented method of claim 4, further comprising:
responsive to a second user replying to the first electronic message to create the second electronic message, sending the second electronic message to the set of intended recipients without the electronic file.

6. The computer implemented method of claim 5, further comprising:
responsive to a third user forwarding the first electronic message to a new recipient to create a third electronic message, sending the third electronic message to the new recipient without the electronic file.

7. The computer implemented method of claim 1, further comprising:
generating a previous histories marker within each electronic message, wherein the previous histories marker indicates the number of electronic messages in the electronic message chain.

8. A computer program product comprising:
a non-transitory computer recordable medium including computer usable program code for managing messages handled by electronic messaging systems, said computer program product comprising:
computer usable program code for creating a unique header associated with a first electronic message;
computer usable program code for creating a hyperlink associated with the unique header, wherein the hyperlink is a selectable element used to replace and link to a content of the first electronic message;
computer usable program code for embedding the hyperlink within a second electronic message to replace the content of the first electronic message in the second electronic message, wherein an electronic message chain comprises the first electronic message and the second electronic message, and wherein the electronic message chain originates with the first electronic message;
computer usable program code for transmitting the second electronic message containing the embedded hyperlink to a set of recipients without the first electronic message; and
computer usable program code for, responsive to a selection of the link in the second electronic message, retrieving the first electronic message;
computer usable program code for retrieving a content of the first electronic message only after receiving a request to view the content of the first electronic message by a user selecting the embedded hyperlink within the second electronic message that replaced the content of the first electronic message in the second electronic message;
computer usable program code responsive to retrieving the content of the first electronic message after receiving the request to view the content of the first electronic message by the user selecting the embedded hyperlink within the second electronic message, for generating a separate pop-up window to display the retrieved content of the first electronic message to the user;
computer usable program code responsive to a current recipient of the electronic message chain adding a new recipient, for displaying access options to the current recipient that define an ability of the new recipient to access previous electronic messages in the electronic message chain; and
computer usable program code responsive to receiving a selection by the current recipient of an access option within the access options displayed to the current recipient, for managing the access of the new recipient to the previous electronic messages in the electronic message chain by:
providing the new recipient access to all previous electronic messages in the electronic message chain in response to receiving a selection by the current recipient of a full access option within the access options displayed to the current recipient;
providing the new recipient access to a set of selected previous electronic messages in the electronic message chain in response to receiving a selection by the current recipient of a limited access option within the access options displayed to the current recipient, wherein the set of selected previous electronic messages comprises only specific previous electronic messages in the electronic message chain selected by the current recipient for viewing by the new recipient, and wherein the access to the set of selected previous electronic messages is restricted by encrypting restricted electronic messages in the electronic message chain; and
providing the new recipient access to only the current electronic message sent to the new recipient in response to receiving a selection by the current recipient of a restricted access option within the access options displayed to the current recipient.

9. The computer program product of claim 8, wherein the computer usable program code for retrieving the content of the first electronic message further comprises:
computer usable program code for pre-fetching the content of the first electronic message content.

10. The computer program product of claim 8, further comprising:
computer usable program code responsive to a first user attaching an electronic file to the first electronic message, for sending the electronic file with the first electronic message to a set of intended recipients.

11. The computer program product of claim 10, further comprising:
computer usable program code responsive to a second user replying to the first electronic message to create the second electronic message, for sending the second electronic message to the set of intended recipients without the electronic file.

12. The computer program product of claim 11, further comprising:
computer usable program code responsive to a third user forwarding the first electronic message to a new recipient to create a third electronic message, for sending the third electronic message to the new recipient without the electronic file.

13. The computer program product of claim 8, further comprising:
   computer usable program code for generating a previous histories marker within each electronic message, wherein the previous histories marker indicates the number of electronic messages in the electronic message chain.

14. A data processing system for managing messages handled by electronic messaging systems, the data processing system comprising:
   a bus system;
   a storage device connected to the bus system, wherein the storage device stores instructions; and
   a microprocessor unit connected to the bus system, wherein the microprocessor unit executes the instructions to:
   create a unique header associated with a first electronic message;
   create a hyperlink associated with the unique header, wherein the hyperlink is a selectable element used to replace and link to a content of the first electronic message;
   embed the hyperlink within a second electronic message to replace the content of the first electronic message in the second electronic message, wherein an electronic message chain comprises the first electronic message and the second electronic message, and wherein the electronic message chain originates with the first electronic message;
   transmit the second electronic message containing the embedded hyperlink to a set of recipients without the first electronic message;
   retrieve a content of the first electronic message only after receiving a request to view the content of the first electronic message by a user selecting the embedded hyperlink within the second electronic message that replaced the content of the first electronic message in the second electronic message;
   generate a separate pop-up window to display the retrieved content of the first electronic message to the user in response to retrieving the content of the first electronic message after receiving the request to view the content of the first electronic message by the user selecting the embedded hyperlink within the second electronic message;
   display access options to a current recipient of the electronic message chain that define an ability of a new recipient to access previous electronic messages in the electronic message chain in response to the current recipient of the electronic message chain adding the new recipient; and
   manage the access of the new recipient to the previous electronic messages in the electronic message chain in response to receiving a selection by the current recipient of an access option within the access options displayed to the current recipient by:
   providing the new recipient access to all previous electronic messages in the electronic message chain in response to receiving a selection by the current recipient of a full access option within the access options displayed to the current recipient;
   providing the new recipient access to a set of selected previous electronic messages in the electronic message chain in response to receiving a selection by the current recipient of a limited access option within the access options displayed to the current recipient, wherein the set of selected previous electronic messages comprises only specific previous electronic messages in the electronic message chain selected by the current recipient for viewing by the new recipient, and wherein the access to the set of selected previous electronic messages is restricted by encrypting restricted electronic messages in the electronic message chain; and
   providing the new recipient access to only the current electronic message sent to the new recipient in response to receiving a selection by the current recipient of a restricted access option within the access options displayed to the current recipient.

* * * * *